April 7, 1959 F. RINGS 2,881,012
PIPE LINE CONNECTIONS FOR METERS AND THE LIKE
Filed Aug. 17, 1953 2 Sheets-Sheet 2
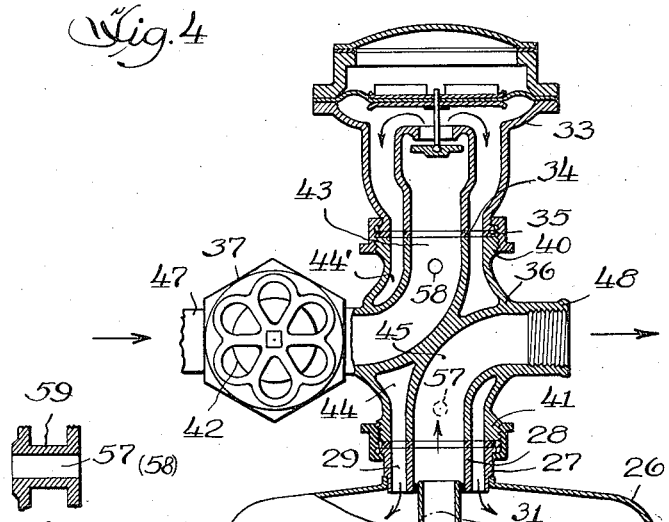
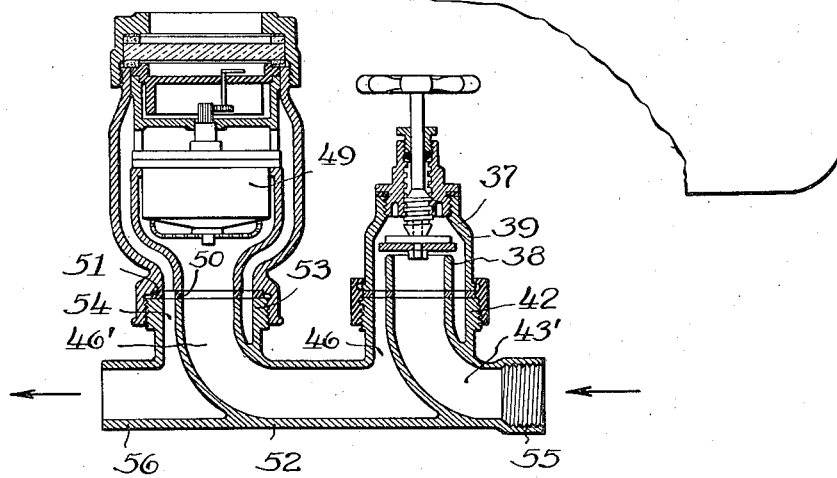
Inventor,
Franz Rings
Jones, Darbo & Robertson
Attys.

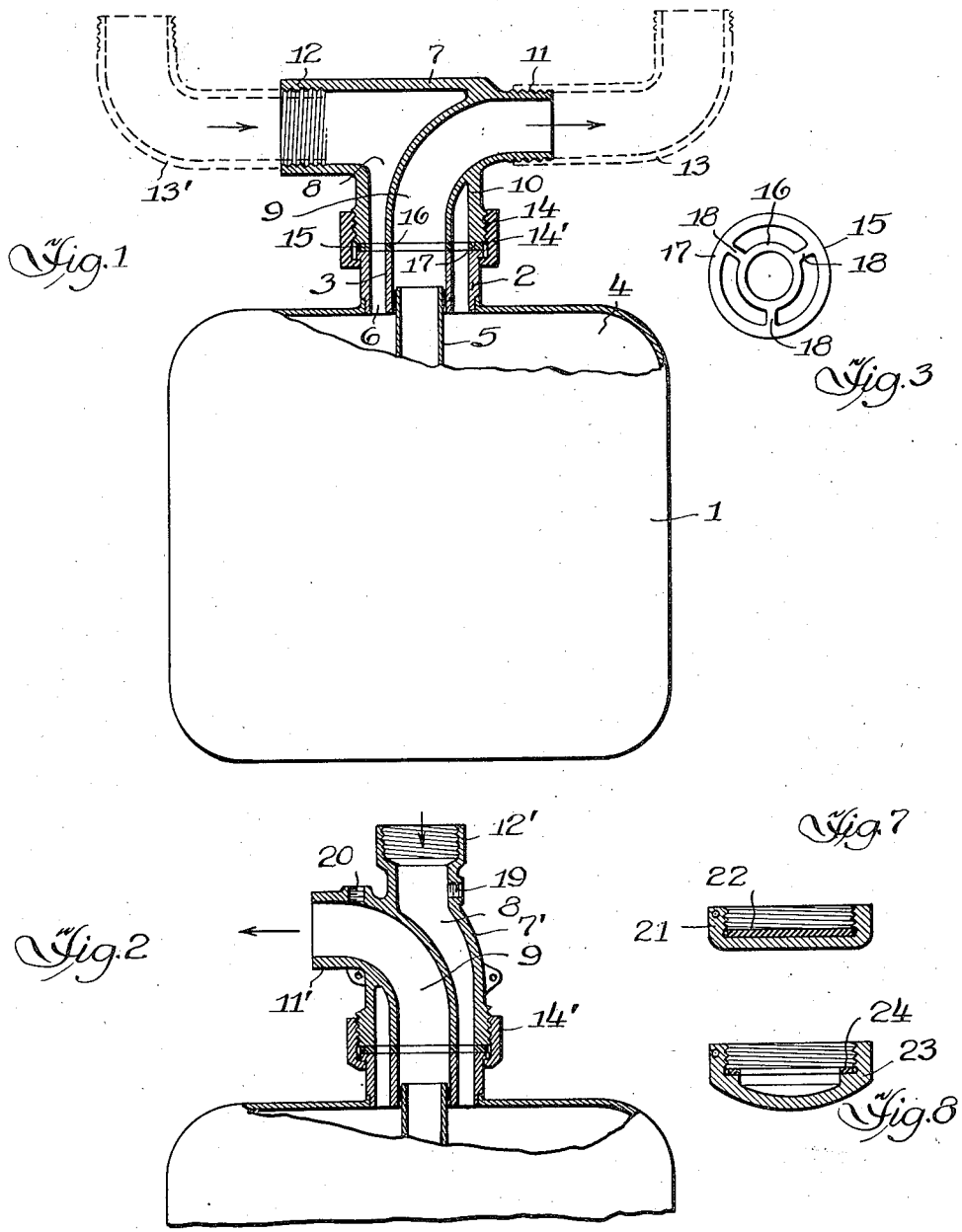

2,881,012

PIPE LINE CONNECTIONS FOR METERS AND THE LIKE

Franz Rings, Nahne, near Osnabruck, Germany, assignor to G. Kromschröder Aktiengesellschaft, Osnabruck, Germany Application August 17, 1953, Serial No. 382,915

Claims priority, application Germany May 7, 1953

4 Claims. (Cl. 285—30)

This invention relates to the design and the connection of devices which are traversed by a flowing gas and for this purpose are fitted to a supply and draw-off pipe. Such devices are, for instance gas meters, water meters, regulating devices, filters, stop valves and the like.

Such devices hereinafter shortly referred to as fluid handling devices or gas handling devices have hitherto been provided with separate inlet and outlet sockets and have been connected to the supply and flow-off pipe by means of intermediate pipe pieces, pipe elbows or the like. Owing to inexact distances with such connections there arise undesired pipe line stresses and tensile forces on the connected devices when installing them. In many cases also it is necessary to intersect such connecting pieces, for instance, if the inlet socket has been provided on the left side of the connected device and occasionally the supply pipe has been installed on the right side. When using intermediate pieces and pipe elbows for connecting the device, a plurality of sealing points are necessary which in particular with lighting gas installations must be considered as sources of danger.

The invention has for its object to simplify essentially the installation of fluid handling devices and to reduce largely the costs of the plant, and in particular to insure a connection being free from stresses while employing as few sealing points as possible.

It is another object of the invention to avoid intersecting pipe connections and to make the plant independent of the occasional position of the connecting pipes. Furthermore, the invention provides the possibility of connecting by means of one joint adapter piece several fluid handling devices, e.g., a stop valve, a regulating device and a meter to the inlet and outlet line.

It is a further object of the invention to provide tapping points capable of being closed at the adapter piece in order to make it possible to connect control devices in parallel to the fluid handling device, without pipe lines or the connected devices themselves being provided with such tapping points.

Substantially the present invention contemplates an adapter piece connected to the inlet and outlet line, with inlet and outlet channels being arranged concentrically one in the other in a device mounted connection socket, the adapter piece having corresponding concentric openings and being rigidly connected with the fluid handling device at the connection socket.

For a fuller understanding of the nature of the invention and its application with different fluid handling devices, reference should be had to the following detailed description taken in connection with the accompanying drawings wherein several preferred embodiments of the invention are shown by way of illustration and not by way of limitation.

In the drawings:

Fig. 1 shows in schematical representation a fluid handling device being in rigid connection with a simple pipe line adapter piece.

Fig. 2 represents in sectional view a fluid handling device being in rigid connection with pipe line adapter piece of somewhat different design.

Fig. 3 shows a packing disk in plan view.

Fig. 4 represents in sectional view the connection of a gas meter, a regulating device and a stop valve by means of one joint pipe line adapter.

Fig. 5 represents in sectional view the connection of a water flow meter and a stop valve by means of a joint pipe line adapter.

Figs. 6, 7 and 8 show particular parts which will be described later.

In Fig. 1 the numeral 1 designates a device being traversed by a flowing medium and having a snout joining socket 2. Inside of the joining socket 2 a further joining socket 3 has been arranged concentrically to the first one. The joining socket 2 is in open connection with the interior space 4 of the device 1, while the joining socket 3 is connected with a tube 5 being arranged inside the device 1. The flowing medium streams into the device 1 through the annular space 6 being formed between the two joining sockets 2 and 3, enters the space 4 and leaves the device again through the tube 5 and the joining socket 3. Thus the inlet and outlet openings are arranged concentrically to one another.

A device 1 being designed in such manner will be connected to a supply pipe and a flow-off pipe by means of a pipe line adapter piece 7. An inlet channel 8 and an outlet channel 9 are arranged in this manner in this pipe line adapter piece 7 so that on the one hand the two channels fall concentrically into a side-branch joint socket 10 and on the other hand into separate joining sockets 11, 12. The joining sockets 11 and 12 may be connected directly to the respective outlet and inlet pipes (not here shown) or indirectly through the intermediation of pipe elbows 13, 13' respectively. Also the adapter piece 7 may be designed this way that the pipe elbows 13, 13' are cast in one piece with it. The joint socket 10 is fitted with an external thread 14 on which a ring nut 14' being supported by the joining socket 2 of the device 1 has been screwed on. Thereby, with any desired twisting in relation to the adapter piece 7, it is possible to connect the device 1 with it by screwing, without such twisting influencing in any way the connection of the concentrically arranged channels 8, 9 with the corresponding channels of the device 1. Simultaneous sealing of the two channels 8 and 9 is accomplished by means of a packing disk 15, as represented separately in Fig. 3. This packing disk consists of an inner packing ring 16 for sealing the channel 9 and the inner joining socket 3, and an outer packing ring 17 lying intermediate the outer joining sockets 2 and 10. Both packing rings 16 and 17 are connected with one another by means of bridges 18.

A pipe line adapter piece 7' fundamentally of the same design as in Fig. 1 has been respresented in Fig. 2. With this adapter piece the joining sockets 11', 12' are arranged in a right angle to one another. Also, in the pipe line adapter piece 7' there are provided threaded tapping holes 19, 20 which may be plugged by means of a screw, and through which the channels 8 and 9 respectively may be connected to a test of measuring apparatus, such as, for instance, a differential pressure gage (not represented in the drawing). Naturally, such tapping holes may of course also be provided with the pipe line adapter piece, as shown in Fig. 1.

By releasing the ring nut 14' the device 1 can easily be disconnected, e.g., for the purpose of repair work that may become necessary, while the pipe line adapter piece 7 or 7' may remain rigidly mounted as component part of the pipe line system. With device 1 being removed, the joining socket 10 of the pipe line adapter piece 7 or 7' may be locked by means of a sealing cap 21 (shown in Fig. 7) that locks simultaneously both channels 8 and 9 by means of a packing disk 22, so that the flow of the medium is interrupted. In case further flow of the medium is desired when the device has been removed, an overflow cap 23 (Fig. 8) may be used, which although sealing the joining socket 10 toward outside by means of a packing ring 24, nevertheless provides junction between the channels 8 and 9 through the space 25. The caps 21 and 23 will be screwed on the thread 14 of the joining socket 10.

A gas meter 26 has been represented in Fig. 4. Since its manner of operation is known in itself, it does not need to be explained here. In contrast to known gas meters having separately arranged inlet and outlet sockets, with this gas meter 26 inlet and outlet sockets 27, 28, in the manner as previously has been described, are provided coaxially one in the other. The gas flowing through the annular space 29 into the gas meter 26 will, after having passed the measuring chambers 30, be carried off through the tube 31 which is connected with the inner outlet socket 28. In Fig. 4 furthermore there has been represented a gas pressure regulator 33 which manner of operation as well is known and does not constitute a part of the invention. In contrast to known regulators also in this case the inlet opening 34, as previously has been described, is arranged coaxially in relation to the outlet opening. The regulator 33 is connected with the gas meter 26 by means of joint pipe line adapter piece 36. In addition pipe line adapter piece 36 carries a stop valve 37 of the type as represented in Fig. 5 with inlet and outlet sockets 38, 39 being arranged coaxially one in the other. According to this, the pipe line adapter piece has three joining sockets 40, 41, 42 with channels 46, 43', 43, 44', 44, 45 lying concentrically one in each other which are in communication accordingly with the inlet and outlet sockets of the devices 26, 33, 37.

If one assumes the stop valve 37, as shown in Fig. 5, to be connected to the pipe line adapter piece 36 of Fig. 4, then the medium flows from a not represented supply pipe through the joining socket 47 into the channel 46, passes the stop valve 37 and leaves it through the channel 43'. Then the medium enters the regulator 33 through the channel 43 and leaves it in the channel 44' in order to enter the gas meter 26 through the channel 44 and finally through the channel 45 and the joining socket 48 to reach the there attached flow-off conduit.

Therefore, by the concentric arrangement of the inlets and outlets at the devices, it is possible to use one single joint pipe line adapter piece 36 for connection of several devices (26, 33, 37) and to realize a simple, nonexpensive and clear installation. The interior channels 45 and 43 of the pipe line adapter piece 36 are provided with closable tapping holes 57, 58, thus, as already has previously been described, making possible to connect measuring or testing devices temporarily to the tapping points. Since, however, the tapping holes 57, 58 have to penetrate the outer channel 44 or 44', a rib 59, as represented in Fig. 6, has been provided intermediate the inner and the outer wall of the channel in order to conduct the tapping holes toward outside.

In Figure 5 the installation of the previously described stop valve 37 has been represented in connection with a water flow meter 49 being as well provided with coaxial inlet and outlet openings 50, 51. The joint pipe line adapter piece 52 as has been employed here has two side by side arranged joining sockets 42, 53 with channels 46, 43'; 46', 54 lying concentrically one in the other and being designed in this manner that the outer channel 46 of the one joining socket 42 communicates with the inner channel 46' of the second joining socket 53, while the two other channels 43', 54 lead to each one pipe joining socket 55, 56 assigned to the supply and flow-off pipes respectively.

The present invention is not limited to the preferred embodiments as have been represented and described hereinabove, but relates also to the design and the connection of other connected devices, such as pumps, blowers and the like accordingly. It is immaterial for the nature of the invention which of the joining sockets being arranged concentrically one in the other is used as inlet and which is used as exit for the flowing medium. Fastening of the connected devices to pipe line adapter piece need not to be done by means of a cap nut. Flanged screw fastenings or also bolt locks (bayonet catches) may be used.

Having thus fully described my invention, what I claim as new and desire to secure by Letters Patent is:

1. The combination of two gas handling devices connected by a pipe line adapter of the class described, comprising, a casing having an outer wall and two openings into its interior through said wall, two tubular members in said casing carried by said outer wall spaced therefrom within the casing whereby a passageway is provided through the casing from one opening to the other, each tubular member having one of its ends communicating with the exterior of the casing through said wall and its other end terminating concentrically within one of said openings in the casing, a gas handling device at each said opening and having a single connecting socket including elements adapted to cooperate with said casing at said opening and said tubular member therein for connection of said device with said adapter, and connecting means for holding each said device in gas-tight connection with said adapter, said means being operative at any desired rotative orientation of said device with respect to said adapter.

2. The structure of claim 1 wherein the two openings in the casing are located at opposite ends of the casing in register with each other and the ends of the two tubular members communicating with the exterior of the casing are co-axial.

3. The structure of claim 1 wherein the two tubular members are united together within the casing.

4. A gas pipe line adapter of the class described, comprising, a casing having an outer wall and openings into its interior through said wall, curved tubular members in tangential relation in said casing carried by said wall and spaced therefrom whereby a passageway is provided in the casing from one opening to another, each tubular member having one of its ends in communication with one of said openings and its other end communicating with the exterior of the casing through said wall at spaced apart places therein, whereby a gas pipe line may be placed in communication with each tubular member at said places respectively, a loop connecting gas handling device in communication with each of said openings respectively and also in communication with the tubular member at said opening, and a union connecting the casing at each opening with the gas handling device thereat, said union having an annular flange engaging a flange on the device and having threaded connection with the casing at the opening, whereby the devices respectively may be connected with any desired rotative orientation.

References Cited in the file of this patent

UNITED STATES PATENTS

| 340,450 | Moore | Apr. 20, 1886 |
| 587,125 | Kennedy | July 27, 1897 |
| 654,615 | Estill | July 31, 1900 |
| 930,640 | Youngs | Aug. 10, 1909 |
| 950,512 | Nicolls | Mar. 1, 1910 |
| 1,160,703 | Fleming | Nov. 16, 1915 |
| 1,326,078 | Matthews | Dec. 23, 1919 |
| 1,934,717 | Johnson | Nov. 14, 1933 |
| 2,114,262 | Havens | Apr. 12, 1938 |
| 2,465,997 | Boutillon | Apr. 5, 1949 |
| 2,492,494 | Mueller | Dec. 27, 1949 |
| 2,579,656 | Douglas et al. | Dec. 25, 1951 |
| 2,799,166 | Rings | July 16, 1957 |